(12) United States Patent
Reeves et al.

(10) Patent No.: US 9,260,994 B2
(45) Date of Patent: Feb. 16, 2016

(54) REDUCTANT INJECTION AND MIXING SYSTEM

(71) Applicant: Cummins IP, Inc., Minneapolis, MN (US)

(72) Inventors: Matt Reeves, Columbus, IN (US); Cary A. Henry, Columbus, IN (US); Michael J. Ruth, Franklin, IN (US)

(73) Assignee: Cummins IP, Inc., Columbus, IN (US)

( * ) Notice: Subject to any disclaimer, the term of this patent is extended or adjusted under 35 U.S.C. 154(b) by 117 days.

(21) Appl. No.: 14/010,384

(22) Filed: Aug. 26, 2013

(65) Prior Publication Data

US 2014/0053538 A1    Feb. 27, 2014

Related U.S. Application Data

(60) Provisional application No. 61/693,144, filed on Aug. 24, 2012.

(51) Int. Cl.

| | |
|---|---|
| *B01D 53/92* | (2006.01) |
| *B01F 5/04* | (2006.01) |
| *F01N 13/08* | (2010.01) |
| *F01N 3/00* | (2006.01) |
| *F01N 3/20* | (2006.01) |
| *F01N 3/28* | (2006.01) |
| *B01F 5/06* | (2006.01) |
| *B01F 3/02* | (2006.01) |

(52) U.S. Cl.
CPC ... *F01N 3/00* (2013.01); *B01F 3/02* (2013.01); *B01F 5/0451* (2013.01); *B01F 5/0466* (2013.01); *B01F 5/0616* (2013.01); *F01N 3/2066* (2013.01); *F01N 3/2892* (2013.01); *B01F 2005/0638* (2013.01); *F01N 2610/06* (2013.01); *F01N 2610/1453* (2013.01); *Y02T 10/24* (2013.01)

(58) Field of Classification Search
USPC .................................. 60/295, 299, 317, 324
See application file for complete search history.

(56) References Cited

U.S. PATENT DOCUMENTS

| | | | | |
|---|---|---|---|---|
| 3,702,619 | A | * | 11/1972 | Son .................................. 137/3 |
| 5,827,490 | A | | 10/1998 | Jones |
| 5,992,141 | A | | 11/1999 | Berriman et al. |
| 6,449,947 | B1 | | 9/2002 | Liu et al. |
| 6,601,385 | B2 | | 8/2003 | Verdegan et al. |

(Continued)

FOREIGN PATENT DOCUMENTS

| | | |
|---|---|---|
| EP | 0 761 299 | 3/1997 |
| RU | 2138323 | 9/1999 |

(Continued)

OTHER PUBLICATIONS

International Search Report and Written Opinion of the International Searching Authority, issued in PCT/US2013/056676, dated Dec. 12, 2013.

*Primary Examiner* — Audrey K Bradley
*Assistant Examiner* — Dapinder Singh
(74) *Attorney, Agent, or Firm* — Foley & Lardner LLP

(57) ABSTRACT

A gaseous reductant injection and mixing system is described herein. The system includes an injector for injecting a gaseous reductant into an exhaust gas stream, and a mixer attached to a surface of the injector. The injector includes a plurality of apertures through which the gaseous reductant is injected into an exhaust gas stream. The mixer includes a plurality of fluid deflecting elements.

10 Claims, 8 Drawing Sheets

(56) References Cited

U.S. PATENT DOCUMENTS

| | | |
|---|---|---|
| 7,178,331 B2 | 2/2007 | Blakeman et al. |
| 7,497,076 B2 | 3/2009 | Funk et al. |
| 7,712,305 B2 | 5/2010 | Kapsos et al. |
| 7,908,845 B2 | 3/2011 | Brown et al. |
| 2008/0250776 A1 | 10/2008 | Brown et al. |
| 2010/0293931 A1 | 11/2010 | Peters et al. |
| 2011/0146254 A1 | 6/2011 | Yi et al. |
| 2011/0219745 A1* | 9/2011 | Griffin et al. ............... 60/274 |

FOREIGN PATENT DOCUMENTS

| | | |
|---|---|---|
| WO | WO-02/29219 | 4/2002 |
| WO | WO-2009/131666 | 10/2009 |

* cited by examiner ific pres-
REDUCTANT INJECTION AND MIXING SYSTEM

CROSS-REFERENCE TO RELATED APPLICATION

This application claims the benefit of U.S. Provisional Patent Application No. 61/693,144, filed on Aug. 24, 2012, which is incorporated herein by reference.

GOVERNMENT LICENSE RIGHTS

This invention was made with government support under ATP-LD Contract No. 0004125 awarded by the Department of Energy. The government has certain rights in the invention.

FIELD

The present application relates generally to exhaust aftertreatment systems for internal combustion engines, and more specifically to selective catalytic reduction (SCR) systems with gaseous reductant injection components.

BACKGROUND

Exhaust aftertreatment systems receive and treat exhaust gas generated by an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

The SCR catalyst is configured to reduce $NO_x$ into less harmful emissions, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of gaseous ammonia. Accordingly, conventional systems are designed to inject an aqueous diesel exhaust fluid or reductant into the exhaust gas, which is capable of decomposing into gaseous ammonia in the presence of exhaust gas under certain conditions. The aqueous reductant commonly used by conventional exhaust aftertreatment systems is a urea-water solution (hereinafter "urea").

Generally, the decomposition of aqueous urea into gaseous ammonia occupies three stages. First, the aqueous urea evaporates or mixes with exhaust gas. Second, the temperature of the exhaust causes a thermolysis-induced phase change in the aqueous urea and decomposition of the urea into isocyanic acid (HNCO) and $NH_3$. Third, the isocyanic acid reacts with water in a hydrolysis process under specific pressure and temperature concentrations to decompose into ammonia and carbon dioxide ($CO_2$). The gaseous ammonia is then introduced at the inlet face of the SCR catalyst, flows through the catalyst, and is consumed in the $NO_x$ reduction process. Any unconsumed ammonia exiting the SCR system can be reduced to $N_2$ and other less harmful or less noxious components using an ammonia oxidation catalyst.

SCR systems typically include a urea source and a urea injector or doser coupled to the source and positioned upstream of the SCR catalyst. The urea injector injects urea into a decomposition space through which an exhaust gas stream flows. Upon injection into the exhaust gas stream, the injected urea spray is heated by the exhaust gas stream to trigger the decomposition of urea into ammonia. As the urea and exhaust gas mixture flows through the decomposition space, the urea further mixes with the exhaust gas before entering an the SCR catalyst. Ideally, urea is sufficiently decomposed and mixed with the exhaust gas prior to entering the SCR catalyst to provide an adequately uniform distribution of ammonia at the inlet face of the SCR catalyst.

Some prior art exhaust aftertreatment systems, however, do not provide adequate decomposition and mixing of injected aqueous urea, which may lead to the formation of solid urea deposits on the inner walls of the decomposition space and urea injector. Additionally, inadequate mixing may result in a low ammonia vapor uniformity index, which can lead to uneven distribution of the ammonia across the SCR catalyst surface, lower $NO_x$ conversion efficiency, and other shortcomings.

SUMMARY

The subject matter of the present application has been developed in response to the present state of the art, and in particular, in response to the problems of and needs from conventional aqueous urea injection systems that have not yet been fully solved by currently available systems. Generally, the subject matter of the present application has been developed to provide a gaseous ammonia injection and mixing system, and associated apparatus, that overcomes at least some of the above-discussed shortcomings of prior art systems.

According to one embodiment, a gaseous reductant injection and mixing system includes an injector for injecting a gaseous reductant into an exhaust gas stream, and a mixer attached to a surface of the injector. The injector includes a plurality of apertures through which the gaseous reductant is injected into an exhaust gas stream. The mixer includes a plurality of fluid deflecting elements.

In some implementations of the system, the plurality of apertures inject the gaseous reductant into the exhaust gas stream in a first direction, where the first direction is generally opposite a flow direction of the exhaust gas stream. The injector may include an upstream facing surface. The plurality of apertures can be formed in the upstream facing surface. The gaseous reductant may be gaseous ammonia or some other gaseous fluid. Further, the gaseous reductant may be pressurized.

According to certain implementations of the system, the injector includes a downstream facing surface. The mixer can be attached to the downstream facing surface of the injector. The plurality of fluid deflecting elements can extend in a downstream direction at an angle with respect to a flow direction of the exhaust gas stream.

In yet some implementations, the injector includes a first annular-shaped tube that is positionable within the exhaust gas stream. The plurality of apertures is formed in the first annular-shaped tube. The mixer can include a first annular ring where the fluid deflecting elements are coupled to the first annular ring. The first annular ring may be attached to a surface of the first annular-shaped tube. In certain implementations, the injector includes a second annular-shaped tube that is positionable within the exhaust gas stream. The second annular-shaped tube can be concentric with the first annular-shaped tube, and the plurality of apertures can be formed in the second annular-shaped tube, as well as the first annular-shaped tube. In some implementations, the first and second annular-shaped tubes are fluidly coupled together via a gaseous reductant supply tube. The mixer can include a second annular ring, and the fluid deflecting elements can also be coupled to the second annular ring. The second annular ring may be attached to a surface of the second annular-shaped tube.

According to yet another embodiment, a mixer for mixing an injected reductant within an exhaust gas stream includes an outer ring with a plurality of first spaced-apart fluid deflection or deflecting elements that each have a radially outward fin and a radially inward fin. The mixer also includes an inner ring with a plurality of second spaced-apart fluid deflection elements that each have a radially outward fin and a radially inward fin. Additionally, the mixer includes a cross-member that couples the outer ring to the inner ring. Each fin is angled with respect to the cross-member.

In some implementations of the mixer, the outer ring is concentric with the inner ring. Each radially outward and inward fin of the outer and inner rings can define substantially curved surfaces. Also, in certain implementations, the first spaced-apart fluid deflection elements are evenly spaced about the outer ring, and the second spaced-apart fluid deflection elements are evenly spaced about the inner ring.

In yet another embodiment, an injector for injecting gaseous ammonia into an exhaust gas stream flowing in a downstream direction includes an outer tube with a plurality of first apertures, an inner tube with a plurality of second apertures, and a gaseous ammonia supply tube that couples the outer tube to the inner tube. Gaseous ammonia is flowable from the supply tube, into the outer and inner tubes, and into the exhaust gas stream through the plurality of first and second apertures.

According to some implementations of the injector, the outer and inner tubes each has a substantially annular shape. The outer tube can be concentric with the inner tube. The plurality of first apertures may be evenly spaced about the outer tube, and the plurality of second apertures may be evenly spaced about the inner tube. In certain implementations, the outer and inner tubes are oriented parallel to a plane perpendicular to the downstream direction. The plurality of first and second apertures can be positioned on the outer and inner tubes such that gaseous ammonia is flowable into the exhaust gas stream through the plurality of first and second apertures in a direction opposite the downstream direction.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
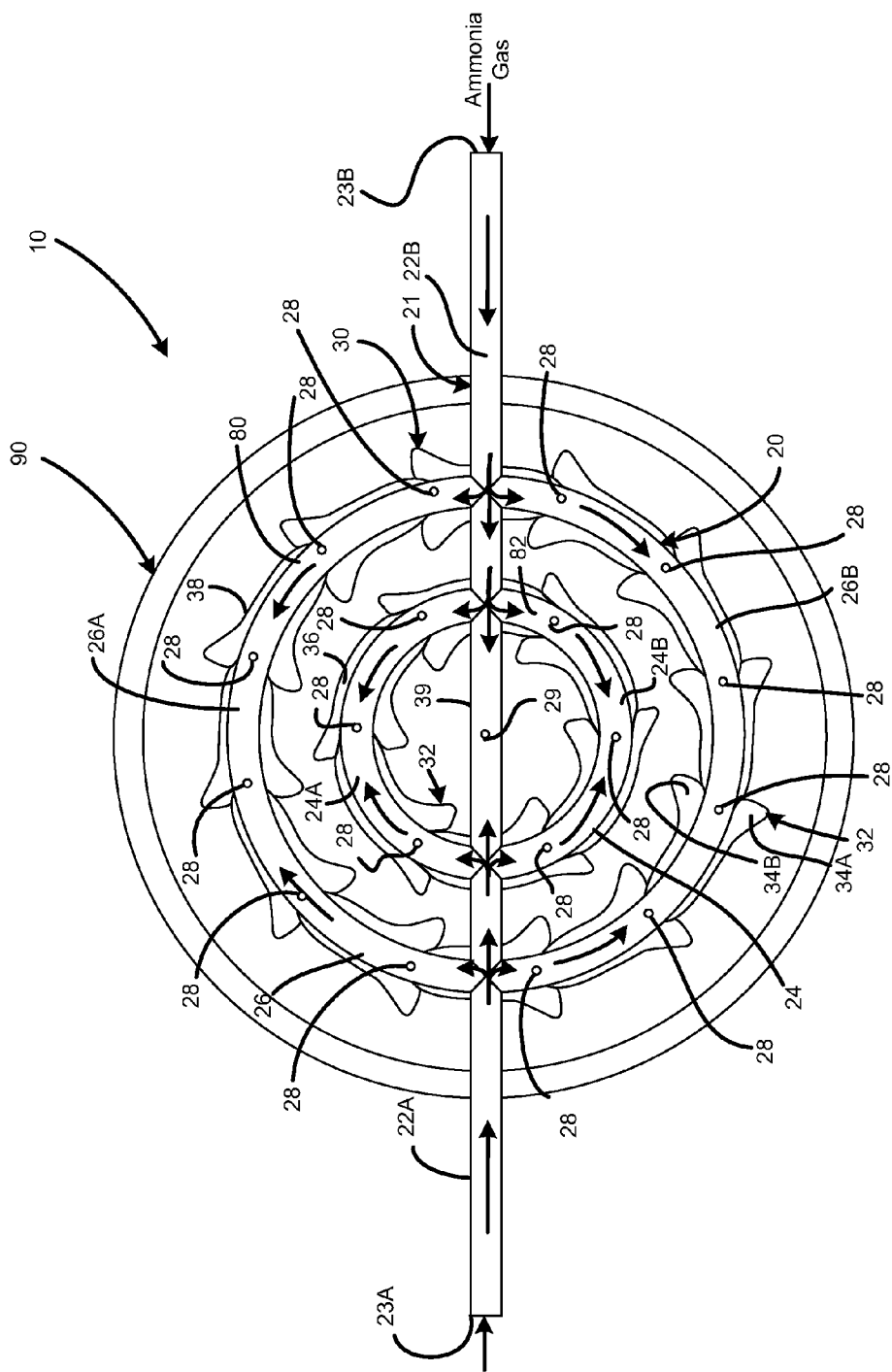
FIG. 1 is a front or downstream view of a gaseous reductant injection and mixing system according to one embodiment.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Described herein are various embodiments of a reductant injection and mixing system and associated apparatus and methods for, among other things, enhancing the concentration of gaseous ammonia in the exhaust gas entering the SCR catalyst of an exhaust aftertreatment system and improving the distribution uniformity of gaseous ammonia entering the SCR catalyst. Generally, the injection and mixing system of the present application is configured to inject a gaseous reductant, such as gaseous ammonia, into the exhaust gas, as opposed to an aqueous reductant, such as aqueous urea associated with conventional systems. Accordingly, in contrast to conventional systems, the system of the present application directly injects gaseous ammonia into the exhaust gas, and subsequently mixes the injected gaseous ammonia with the exhaust gas. Because the ammonia is injected into the exhaust gas in a gaseous form, the decomposition inefficiencies and deposit formations associated with aqueous urea are eliminated. Accordingly, the present system facilitates higher concentrations and distribution uniformity of gaseous ammonia into an SCR catalyst than prior art systems. Additionally, because the need for facilitating decomposition of an aqueous reductant to a gaseous reductant is eliminated, the present system removes the requirement for an extended decomposition tube upstream of the SCR catalyst, which allows close-coupling of the SCR catalyst to the engine.

Although not shown, the reductant injection and mixing system of the present application is used in conjunction with an exhaust aftertreatment system coupled to an internal combustion engine. The aftertreatment system is capable of receiving and treating exhaust gas generated by the engine. After being treated by the aftertreatment system, exhaust gas is expelled into the atmosphere via a tailpipe. In certain implementations, the exhaust aftertreatment system is secured to a vehicle in which the engine is housed. Conventionally, exhaust aftertreatment systems include a plurality of exhaust treatment devices. For example, an exhaust aftertreatment system can include a diesel oxidation catalyst (DOC), a diesel particulate filter (DPF), and a selective catalytic reduction (SCR) system having an SCR catalyst.

Referring to FIG. 1, one embodiment of a gaseous reductant injection and mixing system 10 is shown. The system 10 is at least partially positioned within an exhaust gas line 90 (e.g., conduit or tube) of an exhaust aftertreatment system upstream of an SCR catalyst. Generally, the system 10 injects gaseous ammonia into the exhaust gas stream flowing through the exhaust gas line 90, and mixes the injected gaseous ammonia via the induction of turbulent flow, prior to entering the SCR catalyst. The system 10 includes an injector 20 and a mixer 30 coupled to the injector.

The injector 20 includes an ammonia supply tube 21, and inner and outer injection tubes 24, 26 coupled to the ammonia supply tube in ammonia receiving communication. At least one end of the ammonia supply tube 21 is in gaseous ammonia receiving communication with one or more gaseous ammonia sources (not shown). The ends of the ammonia supply tube 21 may define ammonia inlets 23A, 23B for coupling with an ammonia supply line. In some embodiments, only one end of the ammonia supply tube 21 defines an inlet, and the other has a closed or plugged end. The ammonia supply tube 21 may be coupled to a wall of the exhaust gas line 90 to position (e.g., suspend) the injector 20 and mixer 30 of the system 10 within the exhaust gas line, and consequently within the exhaust gas stream flowing through the exhaust gas line in an exhaust flow direction.

Figure 6:
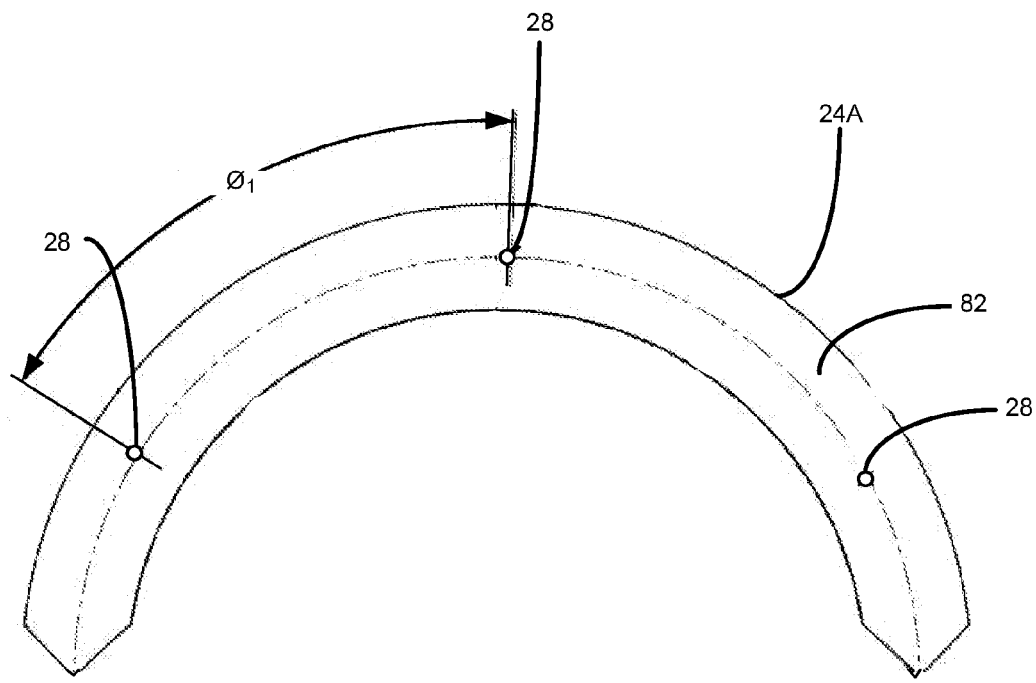
FIG. 6 is a front view of a section of an inner tube of the injector of the gaseous reductant injection and mixing system of FIG. 1 according to one embodiment.
Figure 7:
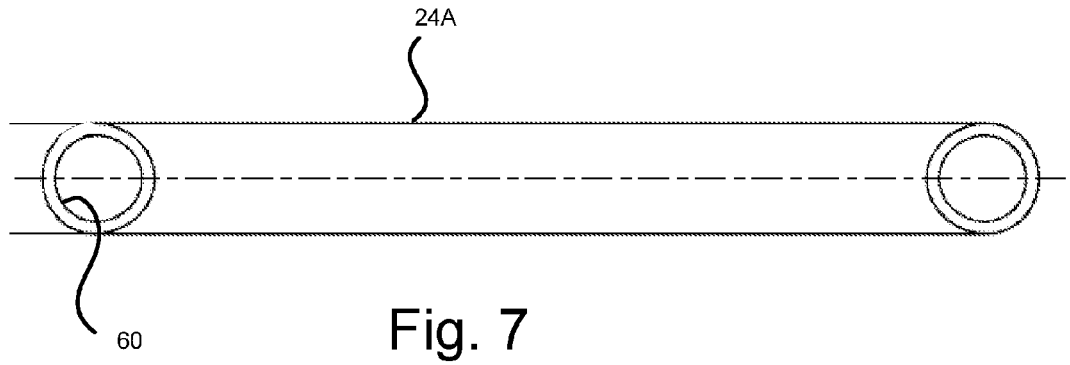
FIG. 7 is a bottom view of the section of the inner tube of FIG. 6.
Figure 8:
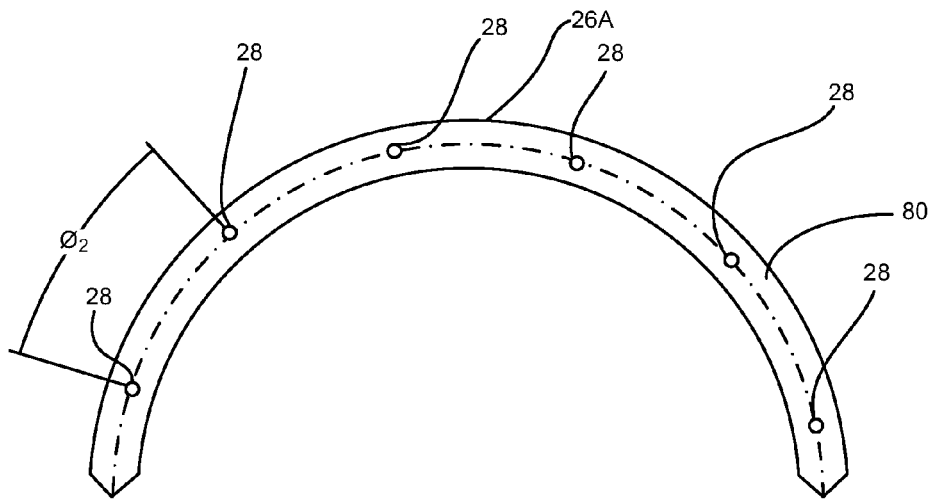
FIG. 8 is a front view of a section of an outer tube of the injector of the gaseous reductant injection and mixing system of FIG. 1 according to one embodiment.
Figure 9:
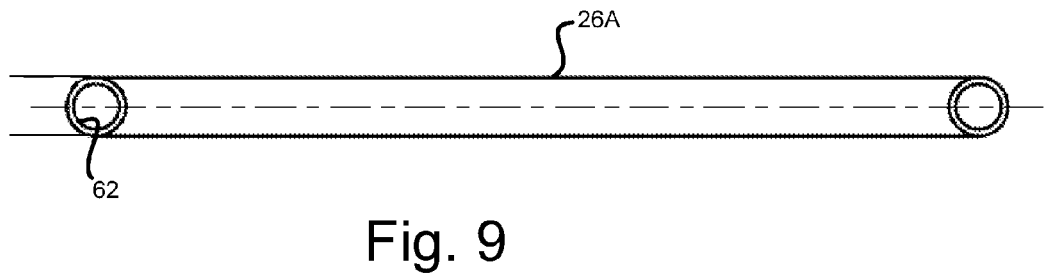
FIG. 9 is a bottom view of the section of the outer tube of FIG. 8.

The inner and outer injection tubes 24, 26 each define substantially circular-shaped or annular-shaped tubes, and are coupled together via the supply tube 21. As shown in FIGS. 6 and 7, the inner tube 24 can include two semi-circular shaped tube sections 24A, 24B. Similarly, as shown in FIGS. 8 and 9, the outer tube 26 can include two semi-circular shaped tube sections 26A, 26B. The outer injection tube 26 defines a larger diameter so as to effectively circumscribe the inner injection tube 24. The ammonia supply line 21 extends through the inner and outer injection tubes 24, 26 to effectively bisect each injection tube. The inner and outer injection tubes 24, 26 each includes a plurality of apertures 28 formed in (e.g., drilled or stamped) and positioned about upstream facing surfaces 80, 82 of the tubes. The apertures 28 extend through only the upstream facing surfaces or sides 80, 82 of the injection tubes 24, 26. In certain implementations, the ammonia supply tube 21 also includes one or more apertures 29 formed in and positioned along an upstream facing surface of the supply tube. For example, in the illustrated embodiment of FIG. 1, an aperture 29 is positioned on the upstream facing surface of the supply tube 21 at a geometric center of the circular-shapes injection tubes 24, 26.

According to one embodiment, as shown in FIG. 6, the apertures 28 formed in the inner injection tube 24 are spaced an equal distance from each other about the inner injection tube. More specifically, in some implementations, the inner tube 24 has six apertures 28 spaced an angle $Ø_1$ apart from each other. In the illustrated embodiment, the angle $Ø_1$ is 60-degrees, but can be any of various other angles associated with any number of apertures as desired. Similarly, according to one embodiment, as shown in FIG. 8, the apertures 28 formed in the outer injection tube 26 are spaced an equal distance from each other about the outer injection tube. More specifically, in some implementations, the outer tube 26 has 10 apertures 28 spaced an angle $Ø_2$ apart from each other. In the illustrated embodiment, the angle $Ø_2$ is 30-degrees, but can be any of various other angles associated with any number of apertures as desired. Although the apertures 28 are evenly distributed about the tubes, in some embodiments, the apertures need not be equi-distant relative to each other. For example, in some implementations, the apertures 28 may be spaced closer together at some locations along the tubes compared to other locations along the tubes.

The mixer 30 includes an inner ring 36 coupled to an outer ring 38 via a cross-member 39. In some implementations, the size and general shape of the inner ring 36 approximately matches that of the inner injection tube 24, the size and general shape of the outer ring 38 approximately matches that of the outer injection tube 26, and the size and general shape of the cross-member 39 matches that of a central portion of the supply tube 21. In certain embodiments, the mixer 30 does not include a cross-member 39 such that the inner ring 36 and outer ring 38 each is formed as a separate and uncoupled element.

Figure 10:
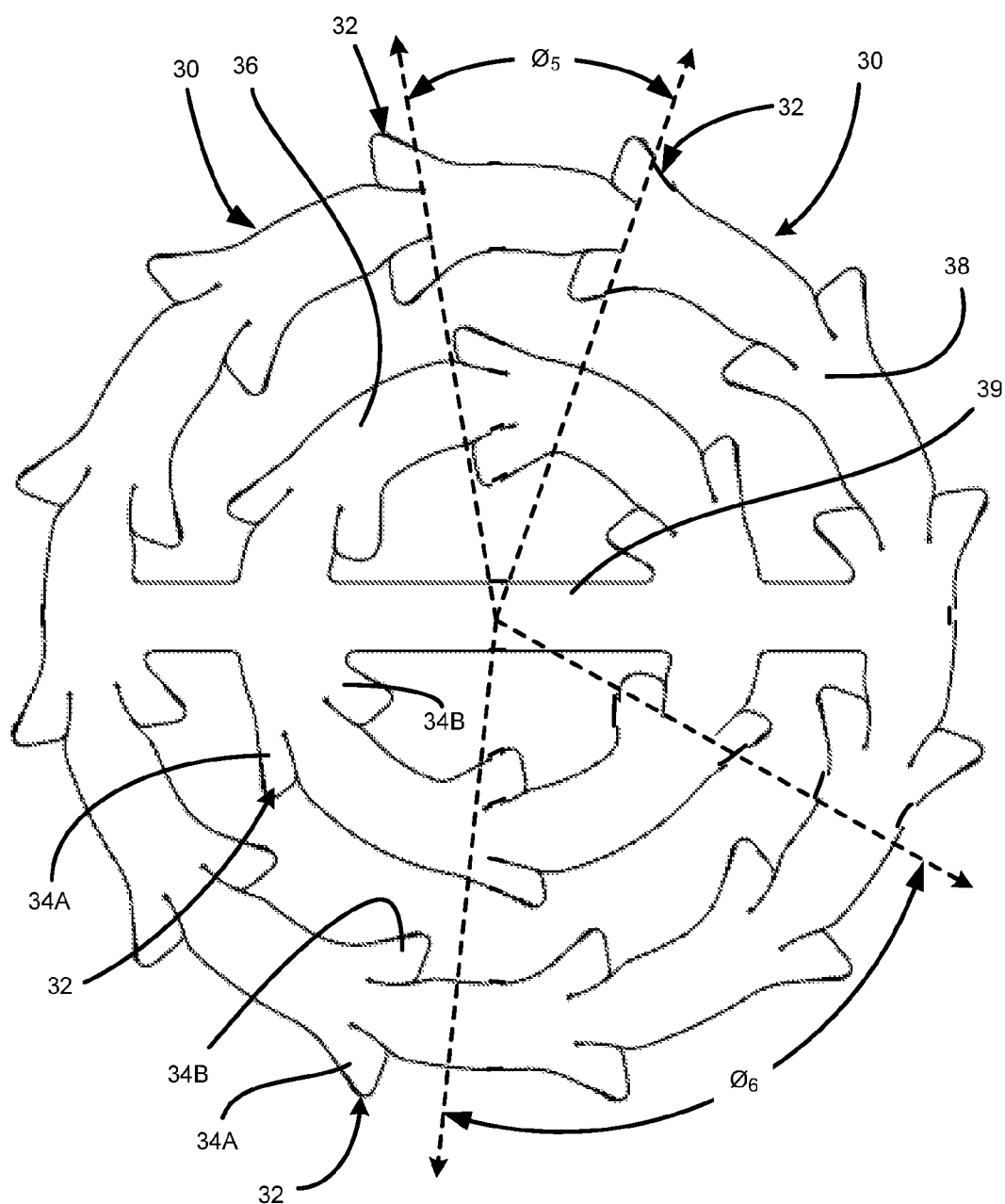
FIG. 10 is a front view of a mixer of the gaseous reductant injection and mixing system of FIG. 1 according to one embodiment.

As shown in FIGS. 1 and 10, each of the inner and outer rings 36, 38 includes a plurality of fluid deflection elements 32 spaced apart about the respective rings. Each fluid deflection element 32 includes radially outer deflection members or fins 34A and opposing radially inner deflection members or fins 34B. The deflection members 34A, 34B are considered radially outer and inner deflection members, respectively, because the deflection members 34A extend from the rings in a direction away from a center or central axis of the rings, and the deflection members 34B extend from the rings in a direction toward a center or central axis of the rings. The fluid deflection elements 32 can be spaced an equi-distant apart from each other about the inner and outer rings 36, 38, respectively. More specifically, in some implementations, such as shown in FIG. 10, the inner ring 36 has six deflection elements 32 spaced an angle $\varnothing_6$ apart from each other. In the illustrated embodiment, the angle $\varnothing_6$ is 60-degrees, but can be any of various other angles associated with any number of apertures as desired. Similarly, according to one embodiment, as shown in FIG. 10, the outer ring 38 has twelve apertures 28 spaced an angle $\varnothing_5$ apart from each other. In the illustrated embodiment, the angle $\varnothing_5$ is 30-degrees, but can be any of various other angles associated with any number of deflection elements as desired. Although the deflection elements 32 are evenly distributed about the rings, in some embodiments, the deflection elements are not evenly distributed about the rings.

Figure 2:
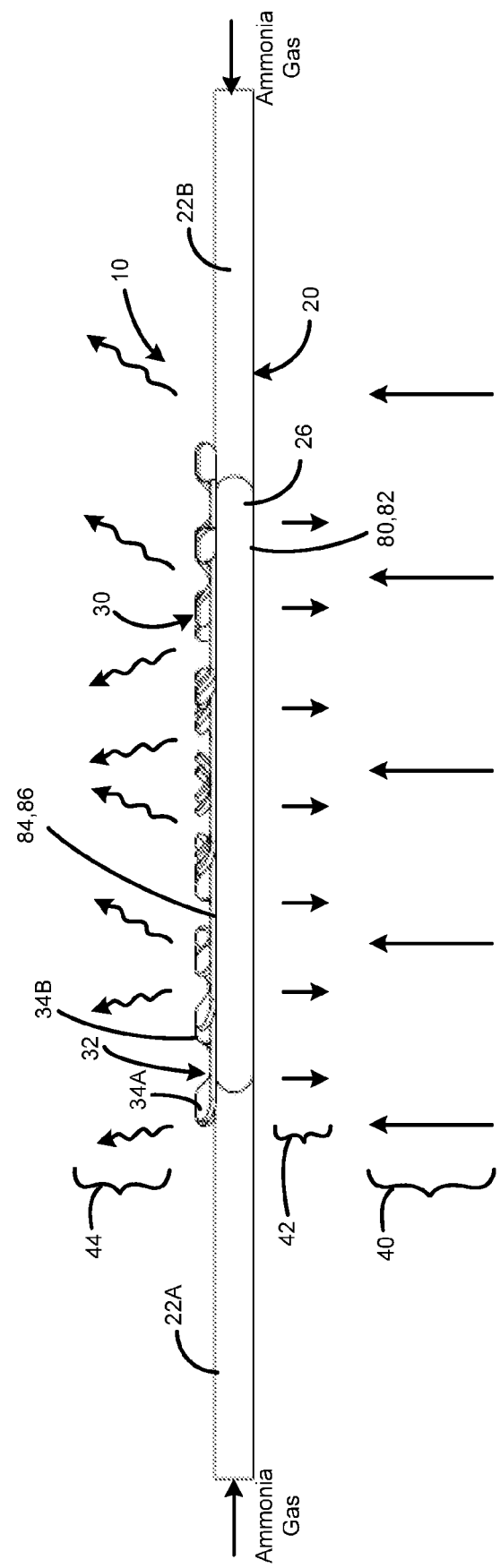
FIG. 2 is a side view of the gaseous reductant injection and mixing system of FIG. 1 shown within an exhaust gas stream according to one embodiment.

As shown in FIG. 2, the mixer 30 is attached to downstream facing surfaces 84, 86 of the injector 20. In the illustrated embodiment, the mixer 30 is attached to the injector 20 such that the inner ring 36 of the mixer overlays (or underlays) the inner injection tube 24, the outer ring 38 of the mixer overlays (or underlays) the outer injection tube 26, and the cross-member 39 overlays (or underlays) the supply tube 21. In this manner, exhaust gas is allowed to flow radially outwardly around the outer injection tube 26 and ring 38, between the outer injection tube and ring, and the inner injection tube 24 and ring 36, and between the inner injection tube and ring, and the central portion of the supply tube 21. The mixer 30 can be attached to the downstream facing surface of the injector 20 using any of various attachment techniques known in the art, such as welding, bonding, fastening, etc. In some implementations, the mixer 30 is removably attached to the injector 20. In yet other implementations, the mixer 30 is integrally formed as a one-piece monolithic construction with the injector 20.

Figure 3:
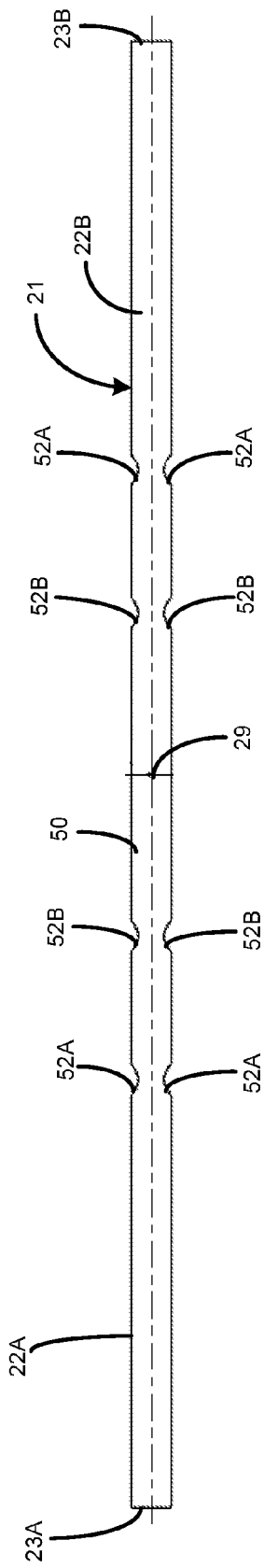
FIG. 3 is a front view of an ammonia supply tube of an injector of the gaseous reductant injection and mixing system of FIG. 1 according to one embodiment.
Figure 4:
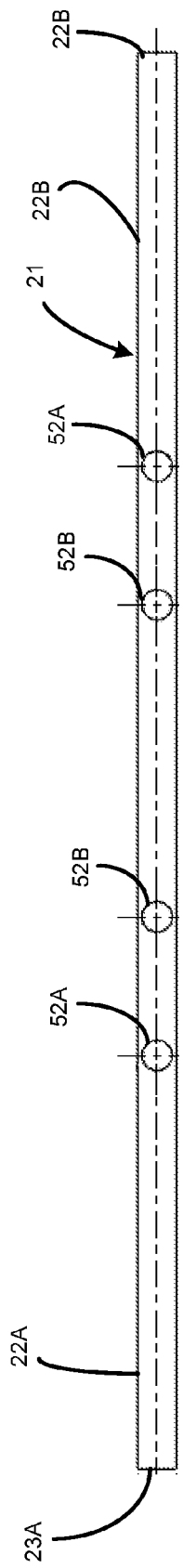
FIG. 4 is a top view of the ammonia supply tube of FIG. 3.
Figure 5:
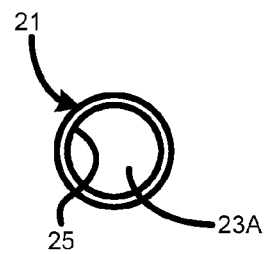
FIG. 5 is a cross-sectional side view of the ammonia supply tube of FIG. 3.

Referring to FIGS. 1 and 2, in operation, when positioned within an exhaust gas stream at a location upstream of an SCR catalyst, gaseous ammonia from a gaseous ammonia source (e.g., a compression tank filled with gaseous ammonia), is supplied to the injector 20 via one of the inlets 23A, 23B of a corresponding inlet section 22A, 22B of the supply tube 21 as indicated by directional arrows. Although not shown, an engine control module can control the supply of gaseous ammonia to the injector according to $NO_x$ reduction needs as dictated by the operating conditions of the engine. Further indicated by directional arrows, the received gaseous ammonia flows through interior conduits 25 defined within the supply tube 21 and into respective interior conduits 60, 62 of the inner and outer injection tubes 24, 26 through respective openings in the supply tube (see, e.g., openings 52A, 52B of FIGS. 3 and 4). From the inner and outer injection tubes 24, 26, the gaseous ammonia is forced through the apertures 28, and from the supply tube 21, the gaseous ammonia is forced through the aperture 29.

As shown in FIG. 2, because the apertures 28, 29 are open to or face the upstream direction, the gaseous ammonia 42 is injected out of the apertures in a direction opposite the flow direction of the exhaust gas stream 40. Because the gaseous ammonia is injected into the exhaust gas against the flow of exhaust gas, a stagnation point is created between the gaseous ammonia and exhaust gas, which improves mixing between the ammonia and exhaust gas. In some embodiments, the apertures 28, 29 may face a downstream direction or any direction between the downstream and upstream direction as desired. For example, the apertures 28, 29 may be greatly or slightly angled with respect to the exhaust flow direction to inject gaseous ammonia into the exhaust gas at the defined angle.

Figure 10A:
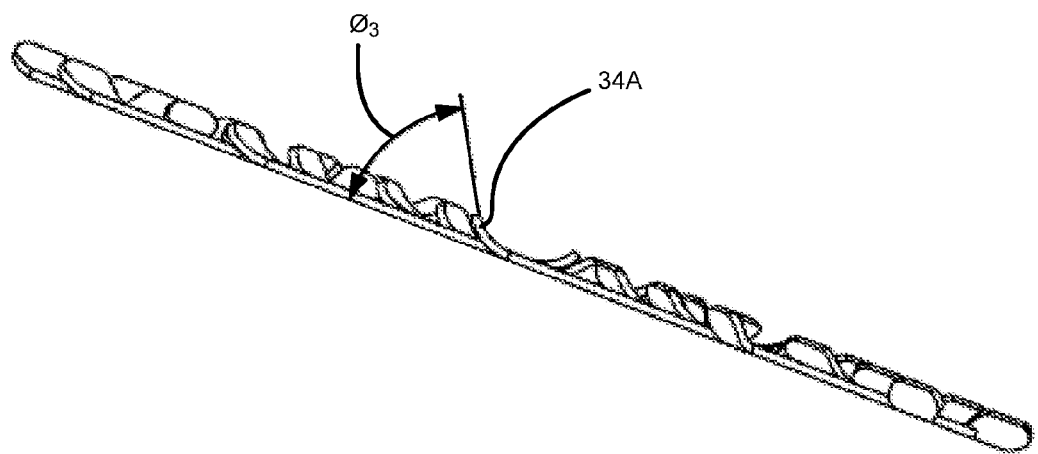
FIG. 10A is a side view of the mixer of FIG. 10.
Figure 10B:
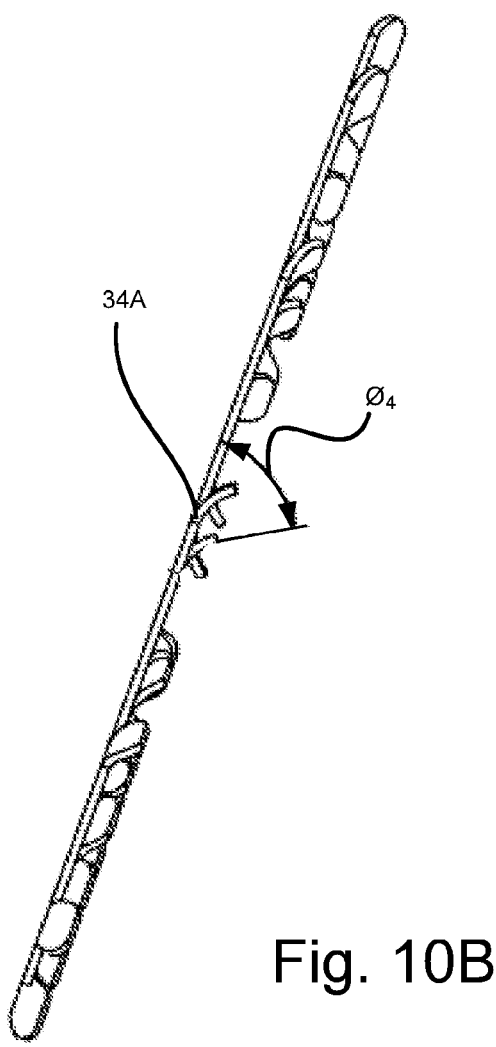
FIG. 10B is a top view of the mixer of FIG. 10.

After the ammonia is injected into, and partially mixes with, the exhaust gas stream, the gaseous ammonia and exhaust gas mixture 44 flows around the fluid deflection elements 32 of the mixer 30. As shown in FIG. 2, the fluid deflection elements 32 promote turbulence and swirling of the mixture 44 by virtue of the configuration of the fins 34A, 34B of the elements. Referring to FIGS. 10A and 10B, the fins 34A, 34B of each of the fluid deflection elements 32 are angled in a downstream direction. In this manner, the fins 34A, 34B deflect the ammonia and exhaust gas mixture 44 radially outwardly and inwardly, which creates pockets of low pressure that effectuates a swirling motion of the mixture. Additionally, the configuration of the fins 34A, 34B induce an angular swirling effect on the exhaust gas (e.g., a swirling of the exhaust gas about an axis that is angled with respect to the main exhaust flow direction), which improves the mixing of the gaseous reductant with the exhaust gas. In the illustrated embodiment, the fins 34A, 34B, being on both the inner and outer rings 36, 38, promote swirling of the exhaust gas in the same direction. However, in other embodiments, the fins can be configured differently to promote swirl of the exhaust gas in opposite directions to facilitate an increase in turbulence to further improve mixing.

As shown in FIG. 10A, the fins 34A, 34B of the elements 32 positioned about the outer ring 38 are angled at an angle $\varnothing_3$ with respect to a plane that is perpendicular to the exhaust flow direction. Similarly, as shown in FIG. 10B, the fins 34A, 34B of the elements 32 positioned about the inner ring 36 are angled at an angle $\varnothing_4$ with respect to a plane that is perpendicular to the exhaust flow direction. The angles $\varnothing_3, \varnothing_4$ can be different or the same (e.g., the angles $\varnothing_3, \varnothing_4$ can each be 60-degrees in one embodiment). The surfaces of the fins 34A, 34B are substantially curved. For example, the upstream facing surfaces of the fins 34A, 34B are convex and the downstream facing surfaces of the fins 34A, 34B are concave.

Figure 11:
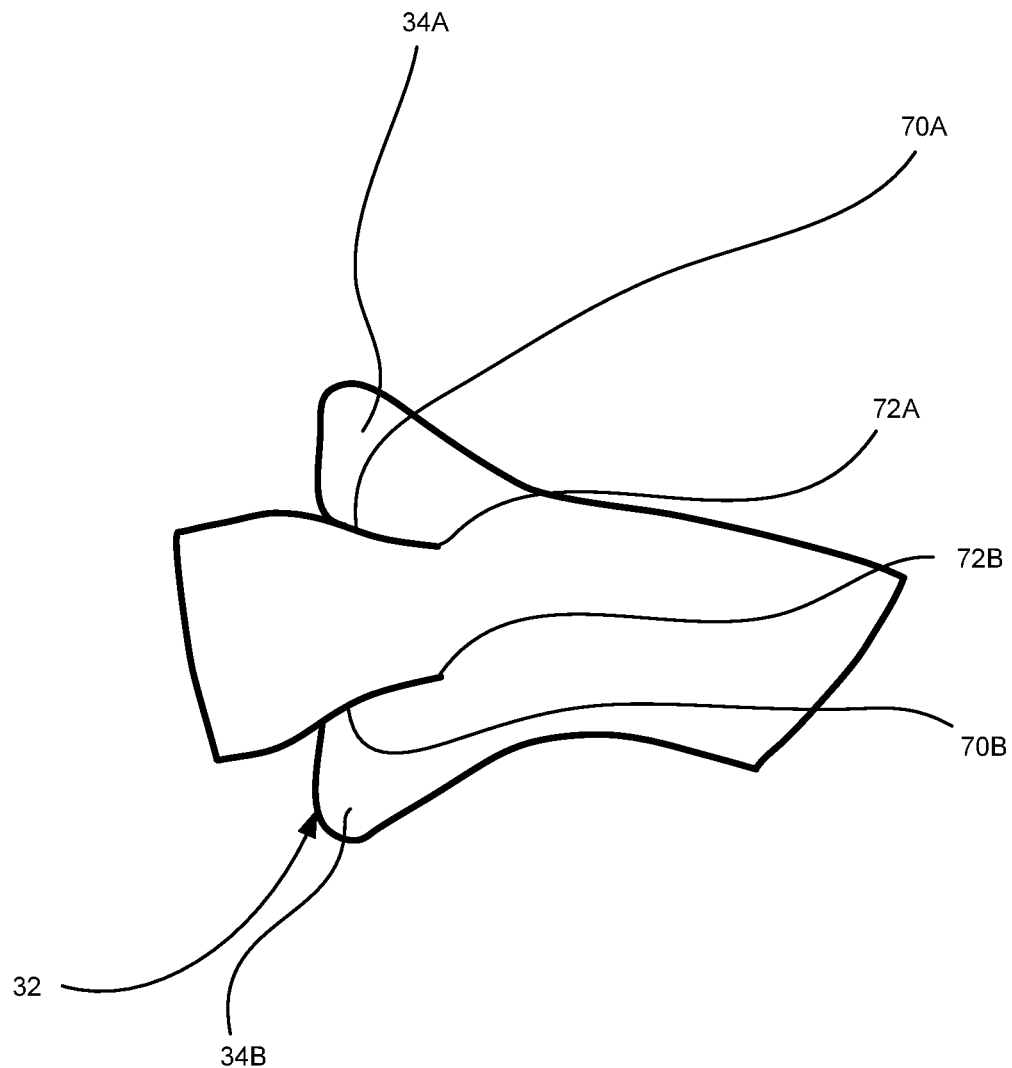
FIG. 11 is detailed front view of a fluid deflection element of the mixer of FIG. 10.

Referring to FIG. 11, each fluid deflection element 32 of the mixer 30 can be formed by cutting opposing slits 70A, 70B in a stamped piece of sheet metal (or relatively flat plate) having the shape of the rings. Small apertures 72A, 72B can be formed (e.g., drilled) into the metal at the termination of the slits 70A, 70B. A metal bending technique can then be used to bend the fins 34A, 34B along the slits 70A, 70B into the desired angles as discussed above. The small apertures 72A, 72B prevent stress risers at the termination of the slits, which may cause undesired tearing or shearing of the metal. The edges of the fins 34A, 34B can have any of various shapes as desired, such as curved as shown, or pointed.

Although the system 10 is shown as an assembly, in some embodiments, the gaseous ammonia injector 20 can be used without the mixer 30 and vice versa. Also, the system 10 can be made by separately manufacturing the injector 20 and mixer 30, such as via stamping or casting techniques, and then later attaching the disparate pieces together. Alternatively, the injector 20 and mixer 30 of the system 10 can be formed together as a one-piece monolithic construction.

Instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A gaseous reductant injection and mixing system, comprising:
    an injector for injecting a gaseous reductant into an exhaust gas stream, the injector comprising:
        an outer injection tube, a plurality of apertures defined in the outer injection tube through which the gaseous reductant is injected into an exhaust gas stream,
        an inner injection tube concentric with the outer injection tube and circumscribed within the outer injection tube, the plurality of apertures also defined in the inner injection tube, and
        a reductant supply tube fluidly coupled to the inner injection tube and the outer injection tube, the reductant supply tube extending through the outer injection tube and the inner injection tube so as to bisect each of the inner injection tube and the outer injection tube, the reductant supply tube including reductant inlets positioned on opposite ends of the reductant supply tube to insert reductant from opposite ends of the reductant supply tube; and
    a mixer attached to a surface of the injector, the mixer comprising a plurality of fluid deflecting elements.

2. The gaseous reductant injection and mixing system of claim 1, wherein the plurality of apertures inject the gaseous reductant into the exhaust gas stream in a first direction, wherein the first direction is generally opposite a flow direction of the exhaust gas stream.

3. The gaseous reductant injection and mixing system of claim 1, wherein the injector comprises an upstream facing surface, and wherein the plurality of apertures are formed in the upstream facing surface.

4. The gaseous reductant injection and mixing system of claim 1, wherein the gaseous reductant comprises gaseous ammonia.

5. The gaseous reductant injection and mixing system of claim 1, wherein the gaseous reductant comprises a pressurized gaseous reductant.

6. The gaseous reductant injection and mixing system of claim 1, wherein an aperture is defined in the reductant supply tube at a geometric center of the outer injection tube and the inner injection tube.

7. The gaseous reductant injection and mixing system of claim 1, wherein the injector comprises a downstream facing surface, and wherein the mixer is attached to the downstream facing surface of the injector.

8. The gaseous reductant injection and mixing system of claim 7, wherein the plurality of fluid deflecting elements extend in a downstream direction at an angle with respect to a flow direction of the exhaust gas stream.

9. The gaseous reductant injection and mixing system of claim 1, wherein the mixer comprises a first annular ring, the fluid deflecting elements being coupled to the first annular ring, and wherein the first annular ring is attached to a surface of the outer injection tube.

10. The gaseous reductant injection and mixing system of claim 9, wherein the mixer comprises a second annular ring, the fluid deflecting elements also being coupled to the second annular ring, and wherein the second annular ring is attached to a surface of the inner injection tube.

* * * * *